United States Patent [19]
Champion et al.

[11] Patent Number: 5,126,936
[45] Date of Patent: Jun. 30, 1992

[54] GOAL-DIRECTED FINANCIAL ASSET MANAGEMENT SYSTEM

[75] Inventors: Robert R. Champion; Basil R. Twist, Jr., both of San Francisco, Calif.

[73] Assignee: Champion Securities, San Francisco, Calif.

[21] Appl. No.: 402,498

[22] Filed: Sep. 1, 1989

[51] Int. Cl.$^5$ .............................................. G06F 15/30
[52] U.S. Cl. .................................... 364/408; 364/401
[58] Field of Search ................................ 364/408, 401

[56] References Cited

U.S. PATENT DOCUMENTS

| | | | |
|---|---|---|---|
| 3,697,693 | 10/1972 | Deschenes et al. | 364/408 X |
| 4,597,046 | 6/1986 | Musmanno et al. | 364/408 |
| 4,903,201 | 2/1990 | Wagner | 364/408 |
| 4,953,085 | 8/1990 | Atkins | 364/408 |

OTHER PUBLICATIONS

Eckardt, Walter L., Jr., and Bridge Data Company, *The Index Market Fund* (1984).

Mayers, Robert C., "One Day Market Forecaster", *Computer Shopper*, Nov. 1987, pp. 236, 253-256.

Crawford, Diane, "Software at His Beck and Call, Manager's Bonds are Beautiful", *Wall Street Computer Review*, Jun. 1985.

Roberts, Steve, "Makes the World Go Round", *Wall Street Computer Review*, Mar. 1989.

*Primary Examiner*—Jerry Smith
*Assistant Examiner*—Allen M. Lo
*Attorney, Agent, or Firm*—Hopgood, Calimafde, Kalil, Blaustein & Judlowe

[57] ABSTRACT

A data processing apparatus and method controls and implements a goal-directed financial assets management system. The operative system receives investor deposits at selected levels of correspondence to established capital markets. A proportionality factor, or "market multiple" MM, is established as a measure of correspondence between the account and each market or asset of interest. The operative system periodically enters new account data and adjusts the individual accounts in response thereto. The system determines a net position change which is translated into aggregate purchase/sale orders of various market index futures contracts or other capital instruments. The system automatically adjusts the risk exposure in any asset category to prevent its reaching an excessive level. As a result, an account can never lose more than the amount deposited. The data processing system provides efficient operation and low transaction fees to the participating investors.

18 Claims, 12 Drawing Sheets

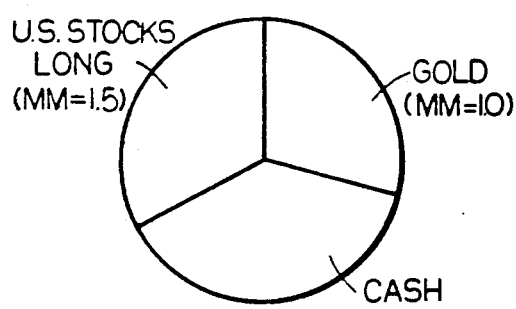
FIG. IA
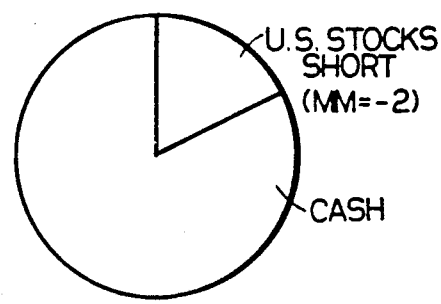
FIG. IB
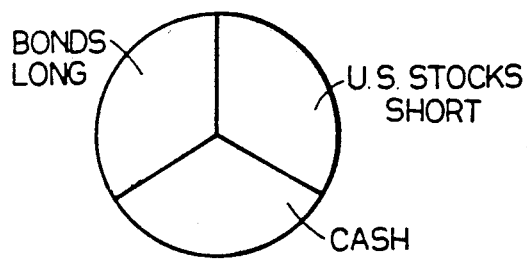
FIG. IC
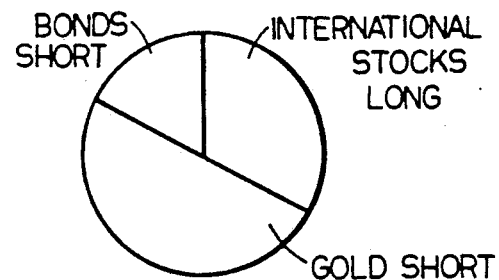
FIG. ID
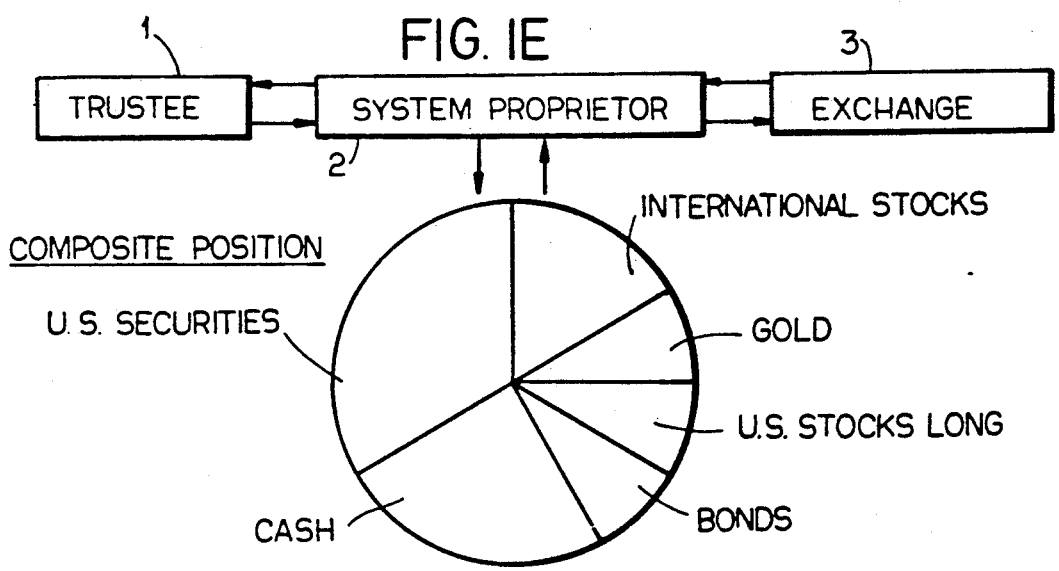
FIG. IE

|   |   |   |   | Market Multiple | | Implied | Short Sale | |
|---|---|---|---|---|---|---|---|---|
| (1) | (2) | (3) | | (4) | (5) | (6) | (7) | (8) |
| TRADE | Request/Event | Cashflow | | Specified | Effective | Leverage | Deposit | Proceeds |
| 1 Pre | Buy 20,000 MM = 1.5 | 20,000 | | 1.50 | | 10,000 | | |
| 2 Post | | | | 1.50 | 1.50 | 10,000 | 0 | 0 |
| 4 Post | Market + 30 | | | 1.50 | 1.43 | 10,000 | 0 | 0 |
| 6 Pre | MM = 2 | | | 2.00 | | 23,000 | | |
| 7 Post | | | | 2.00 | 2.00 | 23,000 | 0 | 0 |
| 9 Pre | Sell 5,000 | -5,000 | | 2.00 | | 18,000 | | |
| 10 Post | | -5,000 | | 2.00 | 2.00 | 18,000 | 0 | 0 |
| 12 Pre | MM = -1 | | | -1.00 | | 0 | | |
| 13 Post | | | | -1.00 | -1.00 | 0 | 17,998 | 17,998 |
| 15 Post | Market - 20 | | | -1.00 | -0.89 | 0 | 17,998 | 17,998 |
| 17 Pre | Sell 2,000 | -2,000 | | -1.00 | | 0 | | |
| 18 Post | | -2,000 | | -1.00 | -0.87 | 0 | 15,998 | 15,870 |
| 20 Pre | MM = 1 | | | 1.00 | | 0 | | |
| 21 Post | | | | 1.00 | 1.00 | 0 | 0 | 0 |
| 23 Post | Market - 30 | | | 1.00 | 1.00 | 0 | 0 | 0 |
| 25 Pre | MM = 2 | | | 2.00 | | 15,234 | | |
| 26 Post | | | | 2.00 | 2.00 | 15,324 | 0 | 0 |
| 28 Post | Market - 20 | | | 2.00 | 2.17 | 15,324 | 0 | 0 |
| 30 Pre | MM = 2 (Reset) | | | 2.00 | | 13,317 | | |
| 31 Post | | | | 2.00 | 2.01 | 13,317 | 0 | 0 |

FIG. 7A

| (9) | (10) | (11) | (12) | (13) | (14) | (15) | (16) |
|---|---|---|---|---|---|---|---|
| Invested Capital | Gain or (Loss) | Equity | Change Units | Total Units | Trade Eff$ Amt | Order Eff Units | Mkt Index |
| 20,000 | 0 | 20,000 | 100.00 | 100.00 | 30,000 | 0.00 | 300 |
| 20,000 | 3,000 | 23,000 | 0.00 | 100.00 | | | 330 |
| 20,000 | 2,999 | 22,999 | 39.39 | 139.39 | -20,000 | 100.00 | 330 |
| 15,909 | 2,091 | 18,000 | -30.30 | 109.09 | 0 | -30.30 | 330 |
| 18,000 | 0 | 18,000 | -163.63 | -54.54 | 18,000 | -218.18 | 330 |
| 18,000 | 1,088 | 19,088 | 0.00 | -54.54 | | | 310 |
| 16,121 | 846 | 16,967 | 6.06 | -48.48 | 0 | 6.06 | 310 |
| 16,967 | 0 | 16,967 | 103.21 | 54.73 | 31,996 | 0.00 | 310 |
| 16,967 | -1,643 | 15,324 | 0.00 | 54.73 | | | 280 |
| 16,967 | -1,642 | 15,325 | 54.73 | 109.46 | 0 | 54.73 | 280 |
| 16,967 | -3,831 | 13,136 | 0.00 | 109.46 | 0 | 0.00 | 260 |
| 16,967 | -3,831 | 13,136 | -7.72 | 101.74 | -30,468 | 109.46 | 260 |

FIG. 7B

GOAL-DIRECTED FINANCIAL ASSET MANAGEMENT SYSTEM

The present invention generally relates to a data processing system for managing a goal directed investment account, designed for individual and small institutional investors. More particularly, the present invention relates to a programmed controlled financial asset management system for implementing investor participation in capital markets through long and short positions in indexed investment vehicles.

BACKGROUND OF THE INVENTION

The world-wide capital markets have undergone unprecedented fluctuations during the past decade in response to changing economic, political and financial conditions. This has created an investment environment characterized by rapidly changing inflationary expectations, high real interest rates, volatile exchange rates, and a fully internationalized capital marketplace. Traditional investment devices such as stocks and bonds have been supplemented with more versatile investment vehicles. Indeed, the advent of computerized trading and other forms of advanced information processing has spawned a new family of investment products. Such newly developed products include: second tier ("junk") bonds; commodity options; international capital, real estate, and currency funds; "unmanaged" index funds; REIT limited partnerships (real estate investment trusts); financial futures contracts, and other so-called derivative instruments on many of these forms of capital. Additionally, the integrated mutual fund family has been expanded to offer a broad collection of separate funds directed to these diverse investment choices.

Mutual funds provide the investor the opportunity to participate in the capital markets at a relatively low fee for portfolio management. Most mutual funds are managed by professional money managers with their fees taken as a percent of net asset value of the fund for a given period. These fees finance the large research departments that sift through and select the various investments for the fund. This management fee often varies between 0.5% to 1.5% of the net asset value of the fund. In addition, mutual funds are a legal cooperative of ownership of the selected securities and, therefore, involve all the legal significance of security ownership to the participating investors without the attendant control thereof.

The professionally managed mutual funds have come under recent criticism due to the fact that a significant percentage of managed funds fail to outperform the general equity markets. Recent studies indicate that a significant percentage of all managed funds were outperformed by the S & P 500 index. The S & P (Standard and Poor's) 500 index is a relative valuation of the stocks of 500 large companies, most of which are listed and traded on the New York Stock Exchange. The S & P 500 index is an indicator of the general performance of the United States equity markets. The relatively poor performance of the managed funds has created substantial interest in unmanaged investment products that track the overall performance of the equity markets unencumbered by asset research fees and high transaction costs. This may be accomplished, for example, through indexed stock funds that invest in the stocks of the S & P 500 companies and, therefore, directly track the performance of the S & P 500 index.

In spite of these alternatives, certain investment strategies remain prohibitively expensive to pursue for a significant number of smaller investors. In particular, many investors employ a technique known as market timing, which involves investing in the equity markets at the perceived time of total market growth and divesting at a later time of perceived market contraction. This strategy is usually based on timing the business cycles for the economy as a whole. The investor pursuing this strategy desires to avoid the risk associated with owning individual stocks.

Somewhat antithetical to the market timer is the investor, who seeks the undervalued stock. This investor desires to negate the business cycles so that the selected individual stock, perceived to be undervalued, has an opportunity to appreciate. This investor, therefore, seeks a means of hedging his investment in the undervalued stock with a countering investment to limit the impact of the business cycle on his stock. This is normally accomplished by investing short in the market (i.e., selling borrowed stock or other assets).

Investor hedging can be expanded to include the broader class of portfolio managers interested in "Beta" management which involves tying the risk level of the investor's portfolio to the overall performance of a selected market to meet the specified risk allotment of the portfolio. Beta management will invariably include both long and short positions in certain assets.

The above-described investors are not particularly well served by presently available investment products. For example, the market timer must buy and sell a grouping of securities to capture the swings of the business cycle—a prohibitively expensive undertaking in terms of transaction costs when dealing with individual stocks. The use of options and futures contracts on stock indices solves some problems and permits the investor to take a short position, but due to the short term nature of these investment products, continuous trading is required even though no change in position is desired.

The advent of mutual funds and especially the "no-load" mutual fund families that combine several individual funds that respectively provide for income or capital growth with no sales charge would appear to provide a low cost investment vehicle to the market timer. The market timer would merely switch from the equity fund to an income fund at a time of perceived weakness in the equity markets. In fact though, most mutual fund families are not designed for active switching and many actually restrict the number and size of switches made by an investor. Many such funds also have the option of redeeming in kind, i.e., redeeming the underlying shares to the investor—an undesirable transaction for the market timer. The restrictions discussed above are specifically designed to inhibit the use of fund families by the market timer. Moreover, investors in mutual funds are by definition, owners of the underlying securities. The ownership of securities involves restrictions and regulations that may place an additional burden on the investor.

In hedging and Beta management, the use of direct futures contracts is prohibitively expensive. Moreover, hedging and Beta management, in part, involve short selling which cannot be accomplished vis-a-vis mutual funds.

To implement the above investment strategies in a cost effective manner, an investment system is required that provides the efficiency and cost of a no-load mutual fund with the versatility of the options and futures contracts market. It was with this understanding of the problems of the prior art that the present invention was made.

SUMMARY AND OBJECTS OF THE PRESENT INVENTION

It is an object of the present invention to provide a data processing system to control account management and investment tracking for participating investors desiring to accurately direct and adjust the level of portfolio risk.

It is another object of the present invention to provide a stored program controlled data processing apparatus to receive investor requests in terms of asset selection, risk adjustment, and deposits and withdrawals, receive adjustments in current market valuation, and in response thereto, make selected purchases of the designated asset or asset related instruments so that the net position of the participating investor accounts reflects the net level of risk desired by the investors.

It is yet another object of the present invention to provide an apparatus for maintaining individual investor accounts that represent either long or short positions in a given capital market and which permits each investor to selectively establish the degree that the account tracks the market for the selected asset in terms of valuation.

The above and other objects of the present invention are realized in a specific illustrative program controlled data processing system that maintains individual accounts each at a selected level of risk for each asset category selected. The data processing system calculates the aggregate level of risk in that asset category for the individual accounts and establishes an aggregate account position based thereon, via purchases or sales of individual securities, futures contracts in a selected market index, e.g., the S & P 500, or other asset related instruments for that asset category. Account funds are otherwise invested in a mix of income bearing instruments, such as U.S. Treasury notes. As the customer changes the level of risk or makes deposits and withdrawals, the accounts are automatically adjusted through market trades in the relevant asset group. Based on the market transactions, each account is updated in terms of exposure and net asset value. A relatively low administration fee is charged to the customers by the system proprietor.

The foregoing features of the present invention may be more fully understood from the following detailed discussion of a specific illustrative embodiment thereof, presented hereinbelow in conjunction with the accompanying drawings, in which:

FIGS. 1A-1E provide a diagram of the risk and asset accumulation process for the present invention.

FIGS. 7A-7B are a spread sheet for a single investor's transactions pursuant to the present invention.

DESCRIPTION OF THE INVENTION

Figure 2:
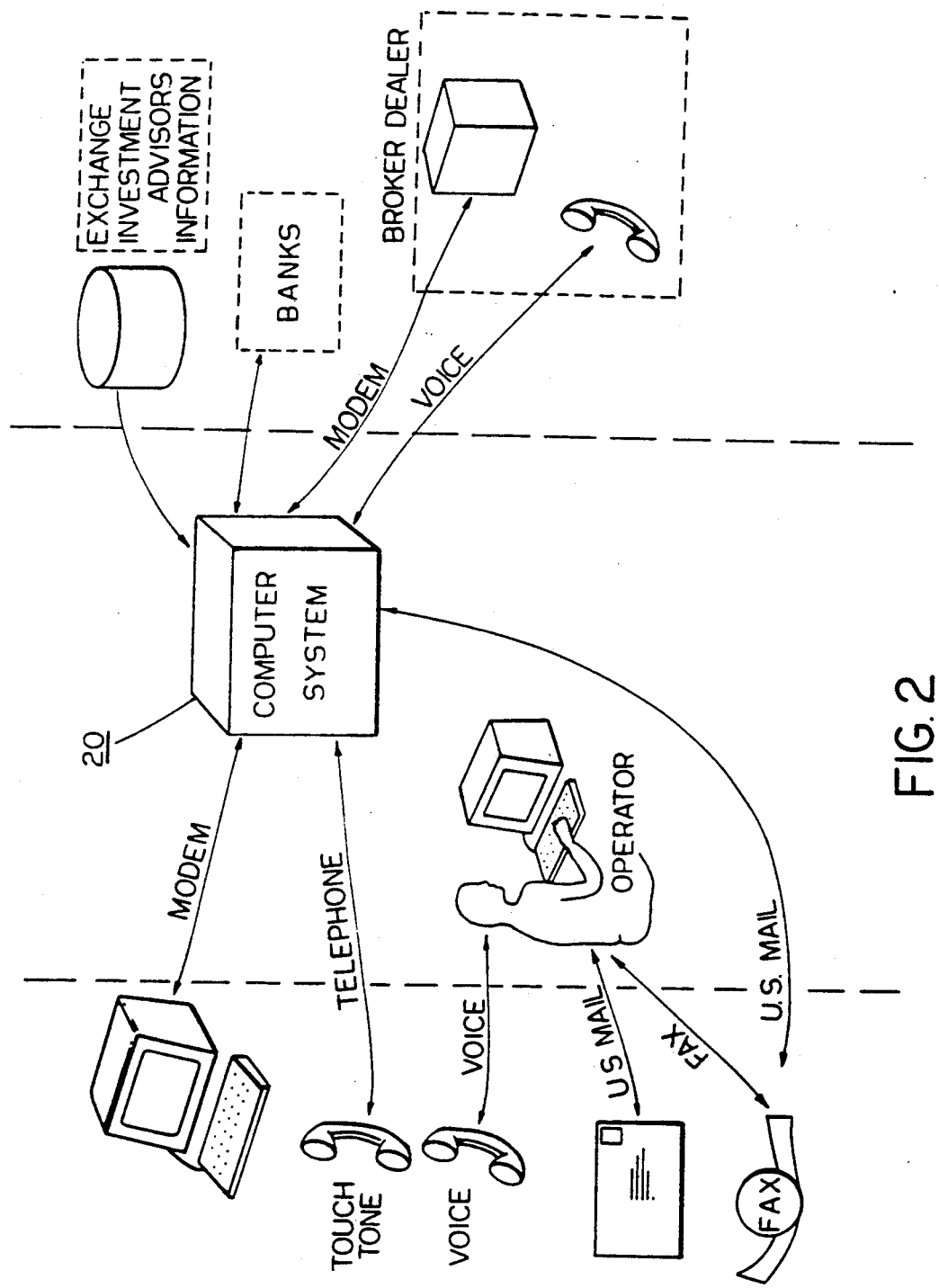
FIG. 2 is a schematic diagram of the functional components for the present invention.

Discussing the instant invention first briefly in overview, it is the fundamental objective of the present data processing system to facilitate the risk management of individual financial asset portfolios. Individual accounts are established in computer memory comprising a monetary valuation and a selected level of correspondence (risk) to changes of valuation of one or more asset groups in each account. The level of risk for each asset group is quantified by a market indicator referred to hereinafter as a market multiple or MM for that asset group. The market multiple specifies the level of correspondence over time between the value of the investor's implied allocation in that asset group and the general market for that asset. For example, an investor wanting part of his/her account to directly track the S & P 500 index selects an MM = 1. A 50% increase in value for the S & P 500 index, including dividends, will then translate into a 50% increase in value of the investor's account, exclusive of system fees.

Individual accounts will respond to one or several asset groups, each with varying levels of risk as indicated by the selected value of the market multiple for each account. This can be viewed as a customer having "bought" or "sold" an amount of an asset category equal to his/her allocation to that category. In fact, no such transaction occurs in the account.

The customer's account simply responds to the various markets (stocks, bonds, gold, etc.) as though such transactions had occurred. Investors selecting a positive MM will be considered "long" in that asset and with a MM greater than 1.0 will have implied "leverage" to achieve the investor's desired level of risk. In a similar manner, a negative MM value means that an investor's account responds in an inverse manner to the asset index similar to being "short" in that asset. System structure restricts an asset category's MM to an allowable range (from negative-short to positive-long) that is specified by the system proprietor and which is a function of the historical volatility of that asset category's market index. The system automatically reduces the implied leverage in a customer's asset category whenever an adverse price change in that asset's market index has caused the category's "effective" MM (risk) to reach an unacceptably high level. The system aggregates the total level of risk for all customer accounts in each asset group and establishes a recommended net position in the appropriate futures contracts or hard assets for that asset group, to correspond to the aggregate risk level (i.e., aggregate MM).

The account management service is operated by the system proprietor according to the data processing methods and apparatus disclosed herein. Referring now to FIG. 1, the overall relationship of system participants is graphically depicted. As can be seen, the system is adapted to receive multiple investors, each requesting diverse types and levels of investment. Customer A, for example, desires the effect of a long position in U.S. stocks, with a corresponding MM of, e.g., 1.5 (MM = 1.5), a straight (MM = 1.0) position in gold, and liquid assets (cash), invested at current short term rates. Customer B, on the other hand seeks the effect of going short on U.S. stocks, e.g., MM = −2.0 with the remainder of his account responding as though it were in cash.

For each participating investor, an account is opened with an initial deposit. These funds are deposited with a bank or similar establishment acting as trustee for the system proprietor. The composite position of the participating investors is calculated for each asset group offered by the system proprietor. These asset group positions are then translated into investments in the marketplace by the system proprietor in a manner that guarantees a return to each participating investor corresponding to the implied "position" (MM) in that asset group. More particularly, the system proprietor is in communication with various exchanges or brokers and will place buy/sell orders in each asset group according to the aggregate level of exposure. Certain investors' choices of asset and MM, when aggregated, will result in no net purchases on the exchange, e.g., Customer A's position in U.S. stocks (long) will partially offset Customer B's position in U.S. stocks (short). Nevertheless, the system, as will be more fully discussed below, will provide both Customer A and Customer B with their selected level of correspondence to the U.S. stock market.

The functional components of the operative system are presented in FIG. 2. These components are interconnected and communicate, via address and data busses in the computer hardware 20. Investment account data is entered into the system through various forms of inputs which will include interactive terminals at, e.g., a participating investor's location. Other forms of input to the system can include interactive data entry through a personal computer or a touchtone telephone system as is per se well known to those skilled in this art. The data entry will include requests for deposits, withdrawals and changes in the market multiple, MM.

A communication link exists between the system proprietor and the trading exchange for the asset markets of interest. This link provides the data processor with current market data in terms of index values and interest rates. This information is time tagged and digitized for entry into the system. The system proprietor will trade assets on the exchange pursuant to the calculated position provided by the system, and the current market data.

System operation is governed by the CPU (central processing unit) which receives the inputted data from the participating investors, in terms of deposits or withdrawals and changes to asset category weighting and respective MM. The CPU then performs an iterative calculation determining a required asset mix position for each account in response to the recently entered data for the operative period. The CPU aggregates the individual required trading positions for each account in each asset to determine a net trade in that asset group in response to all participants' requests and thereafter provides a recommended buy/sell order for execution in the marketplace. To the extent that the net of deposits and withdrawals and changes in asset weightings and MMs results in no new buying or selling being required by the system proprietor, significant transaction expenses are saved, which enable lower fees to be charged to participants.

Confirmation of the trade execution on the exchange is transmitted back to the system which then updates each account balance accordingly, with the end period information stored in memory. Access to the current account information is available to each participant, via the above-described input arrangement.

As indicated in FIG. 2, the management system is a programmed controlled data processor with attendant input/output capabilities, account and exchange communication links, and mass data storage. The hardware used to accomplish the herein described programmed directives is preferably a microprocessor based computer system compatible with the selected programming language and peripherals and having sufficient computational speed to handle the level of participating investors at the selected level of turnover. The mass storage of the account data is preferably by magnetic storage media, although other forms of data storage are acceptable if non-volatile and having sufficient volume. Although the programming language is not particularly limitative, the large data bases involved in this system would be best handled by a higher order relational database language for implementation.

Figure 3:
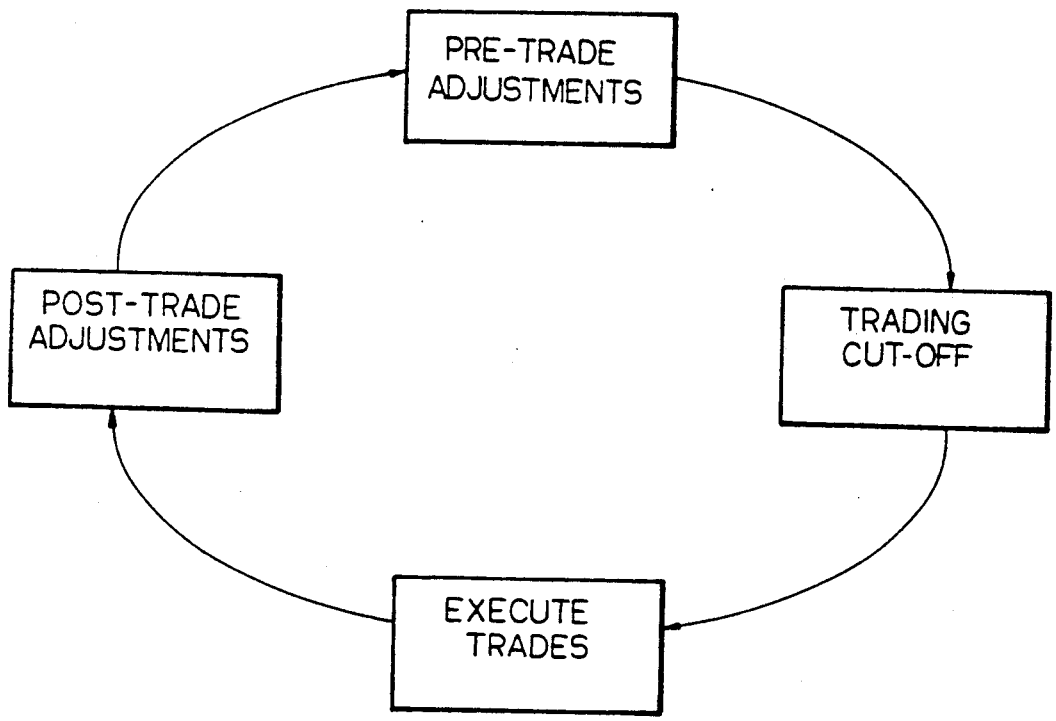
FIG. 3 is a flow chart for the overall system operation according to the present invention.

Referring now to FIG. 3, the sequence of operations is shown in block diagram form. In essence, the system is in continuous operation, reflected by the circular path between the operative events. Event (1) involves the Pre-Trade Adjustments made to the accounts pursuant to entered changes in MM, and deposits or withdrawals for various asset groups. These adjustments are made corresponding to the entered request by participating investors. A Trading Cut-Off Event (2) is set, and requests received after this event are incremented to the next trading period for execution. Event (3) provides for the system execution of all the requisite trading for that trading period. Execution of these trades are made and confirmed via communication with the various exchanges as discussed above. The operative path conceptually terminates with Event (4) which involves the Post-Trade Account Adjustments reflecting the just completed trade execution. The next trading cycle is then initiated for all orders and requests received after the prior Trade Cut-Off.

Figure 4:
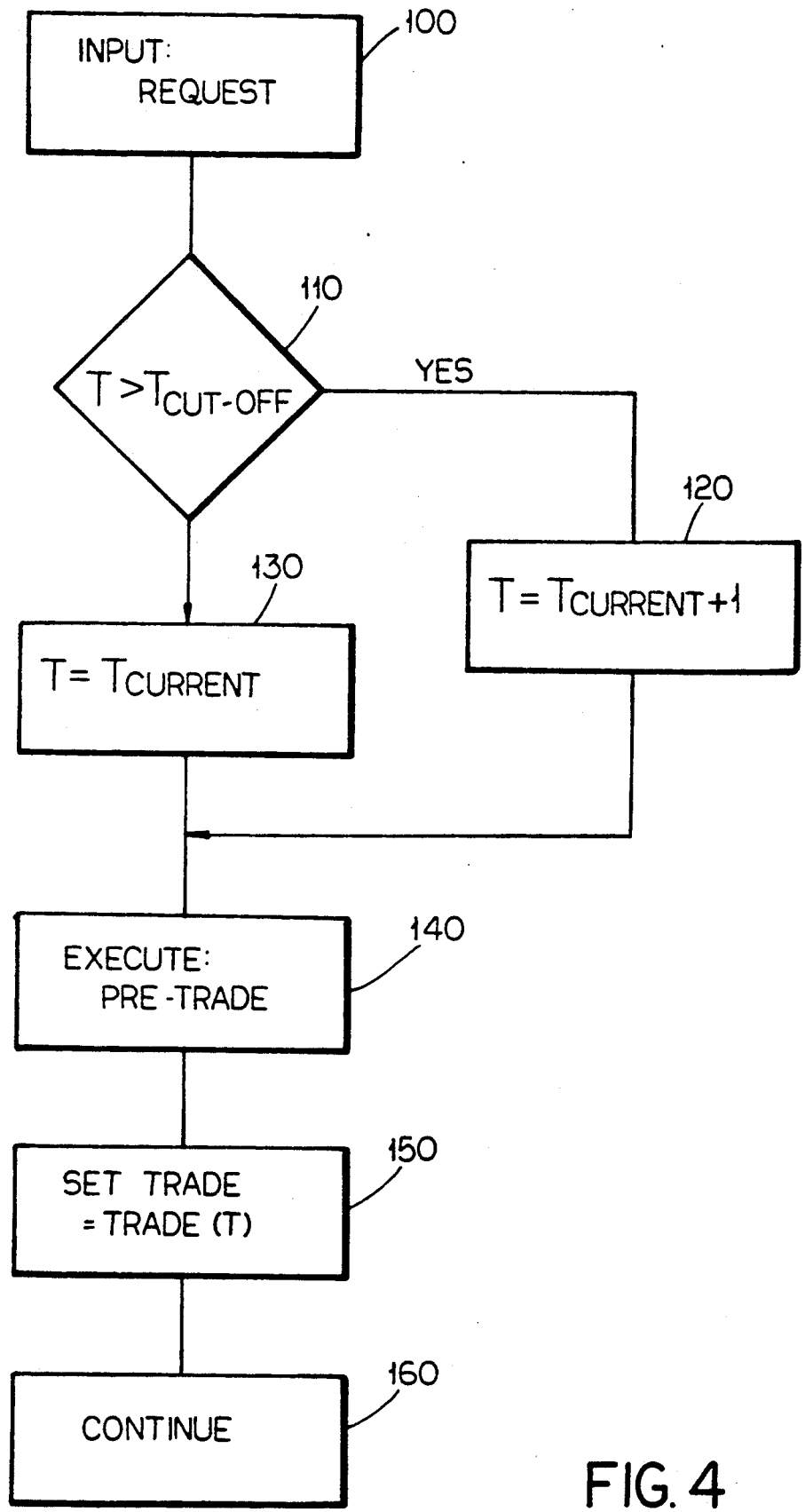
FIG. 4 is a flow chart for the customer data entry into the system.

The input of customer instructions can be more clearly understood in conjunction with FIG. 4, wherein customer instructions are entered into the system, Block 100, and time tagged (T). Test 110 determines whether the request is before or after the current trade Cut-Off (T) (Event 2 of FIG. 3). If before, the transaction requested is placed for the current trade execution event (Block 130). Otherwise, the transaction is incremented to the next trade execution event (Block 120). In either case, the system performs the Pre-Trade Adjustments, Block 140, for that participating investor, in preparation for trade execution at the designated trading execution event (Block 150). As can be seen, all trades by the proprietor in response to participating investors' requests are separately and sequentially numbered using the counter "T" thus forming a string of trading "Lots" for each account.

The Pre-Trade Adjustments involve converting the investors' inputted requests into an executable trade format reflective of the investor's adjustment in that asset category. This conversion process is broken down into two components since, during the Pre-Trade Event, actual prices for buy/sell orders are unknown. The two components are the effective dollar amount for the adjustment (EFF$AMT) and the effective units (EFFUNITS) for the adjustment. The effective units are, in fact, the expected actual units of the index or its futures contracts that will result from the upcoming trade.

Figure 5:
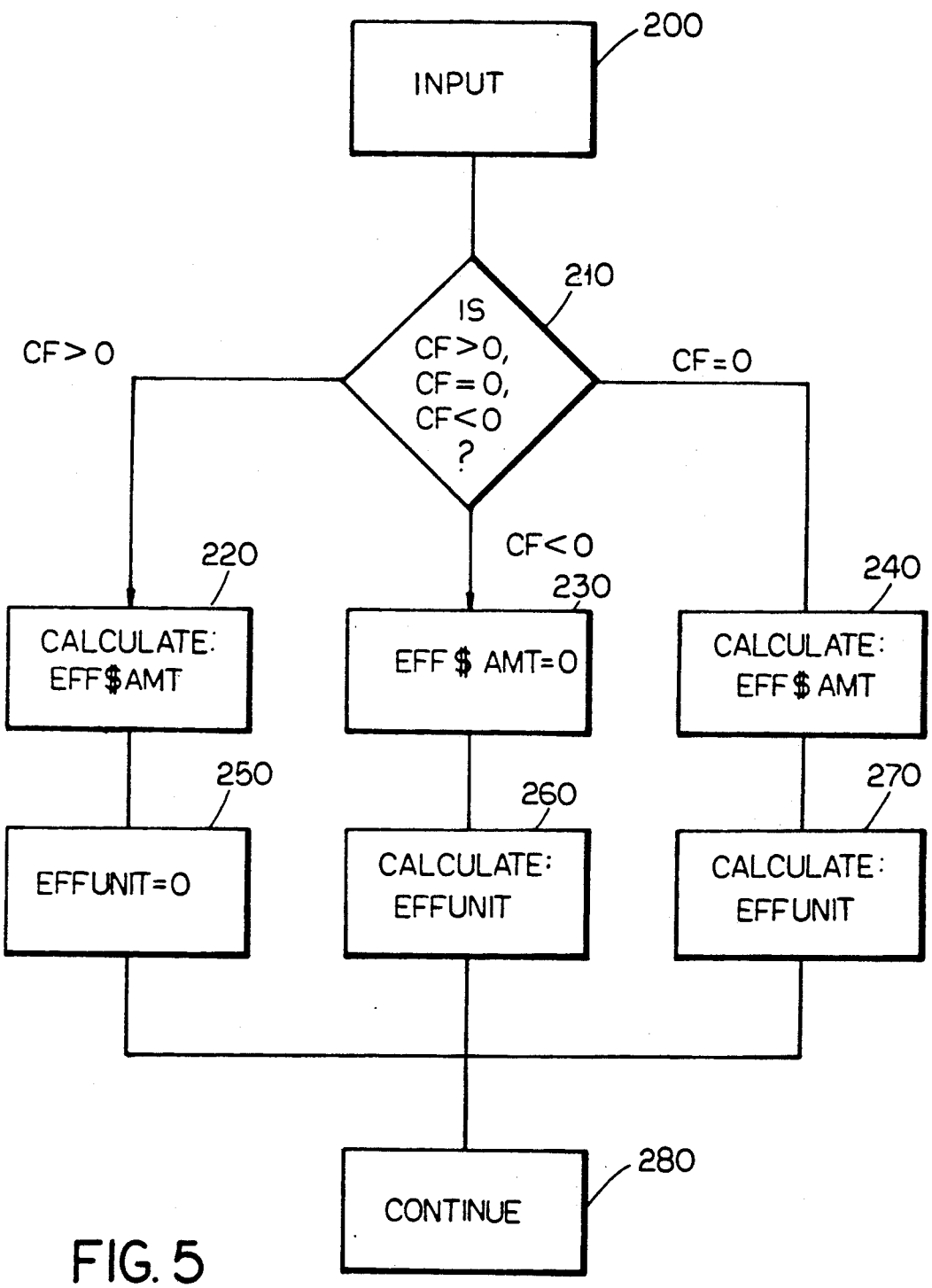
FIG. 5 is a flow chart for the pre-trade system operation.
Figure 6A:
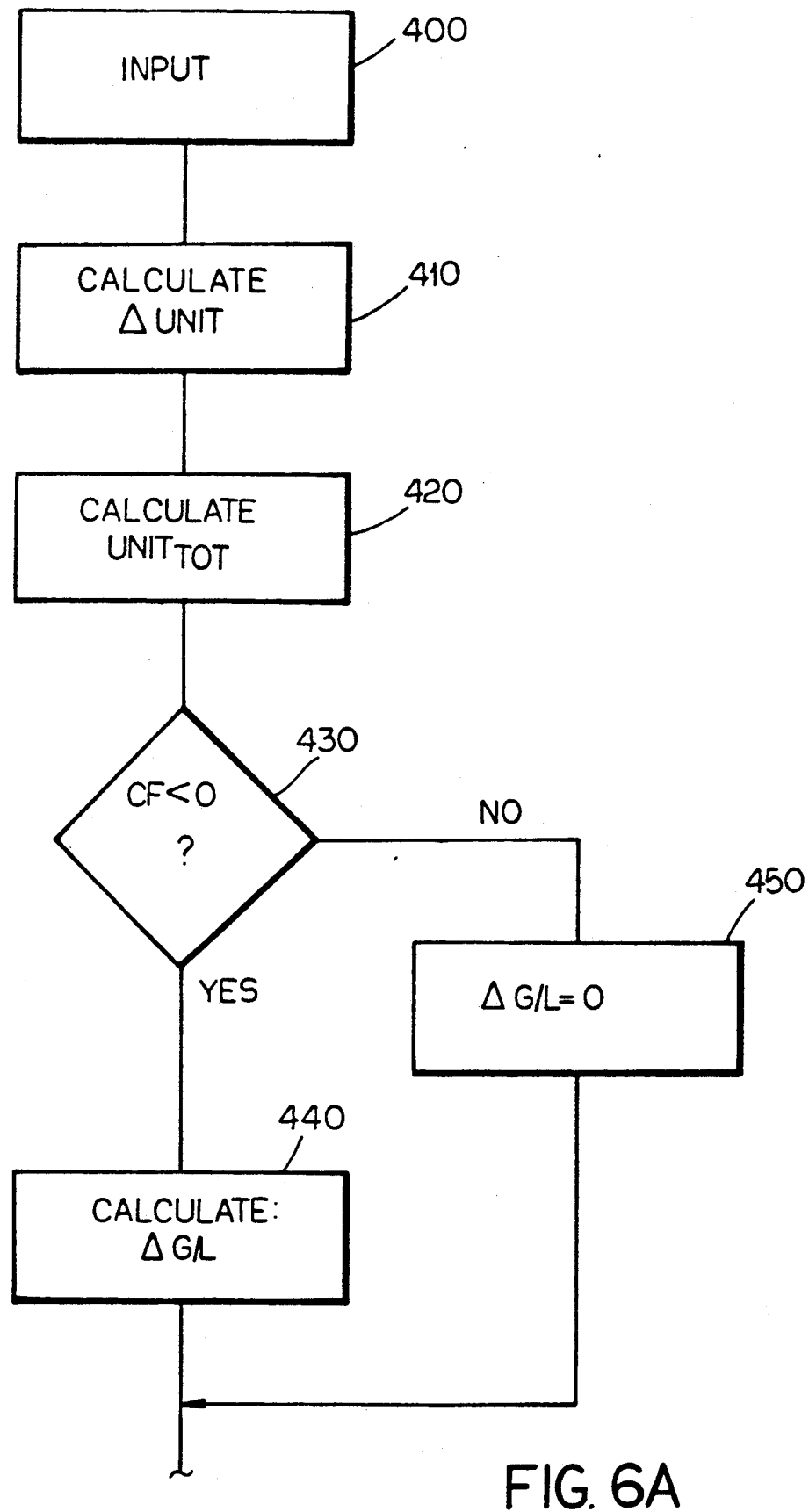
FIGS. 6A-6E are a flow chart for the post-trade system operation.
Figure 6B:
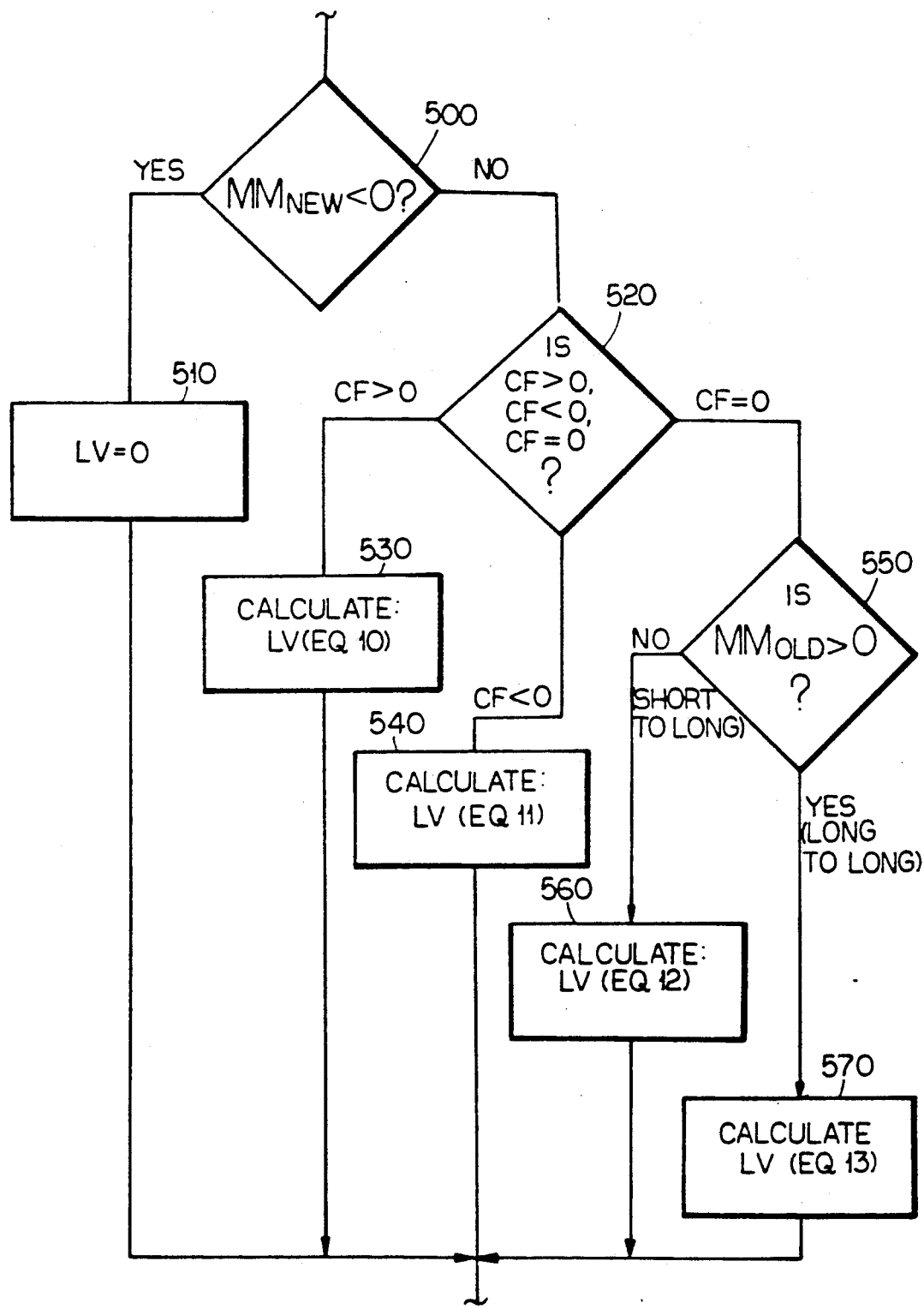
Figure 6C:
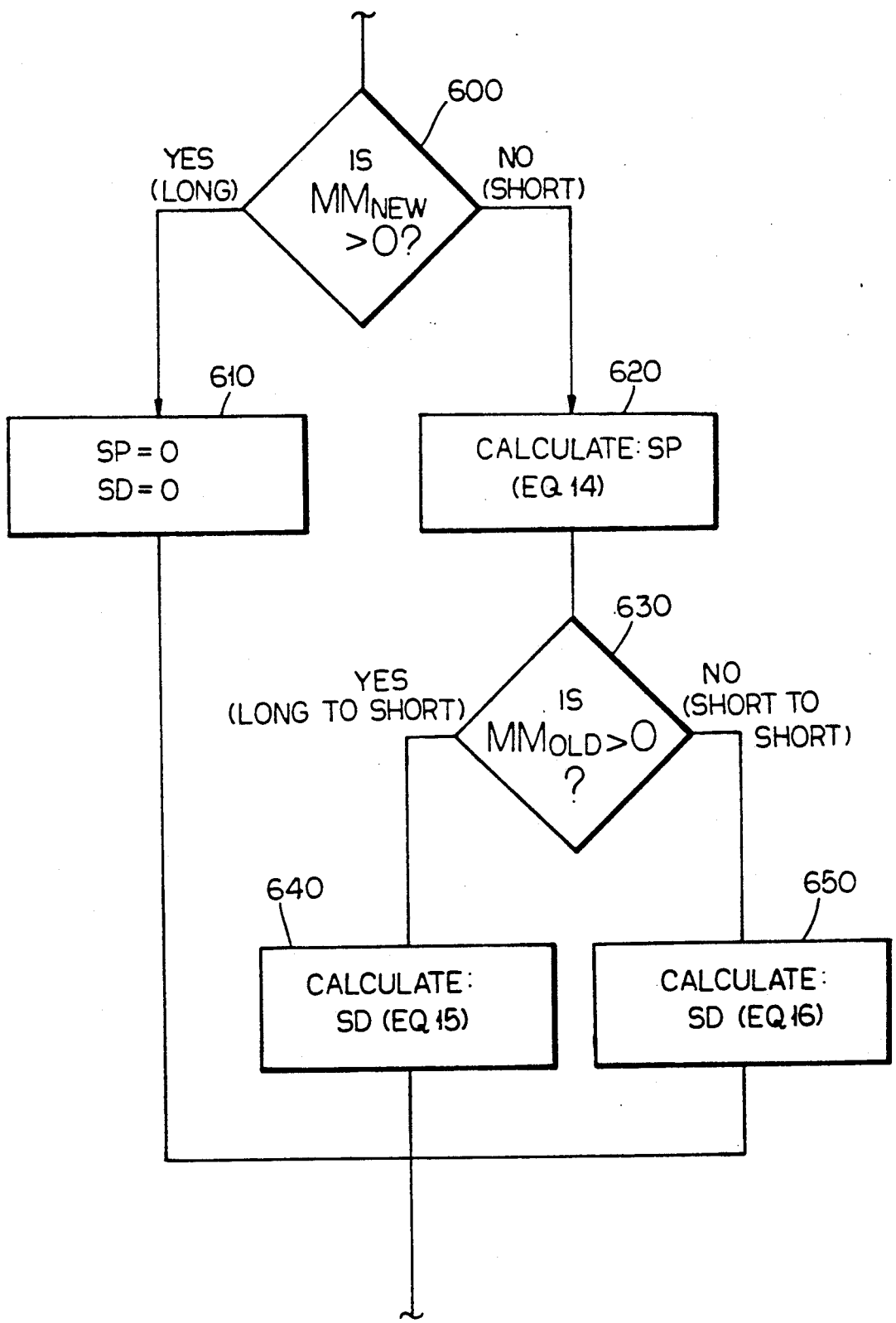
Figure 6D:
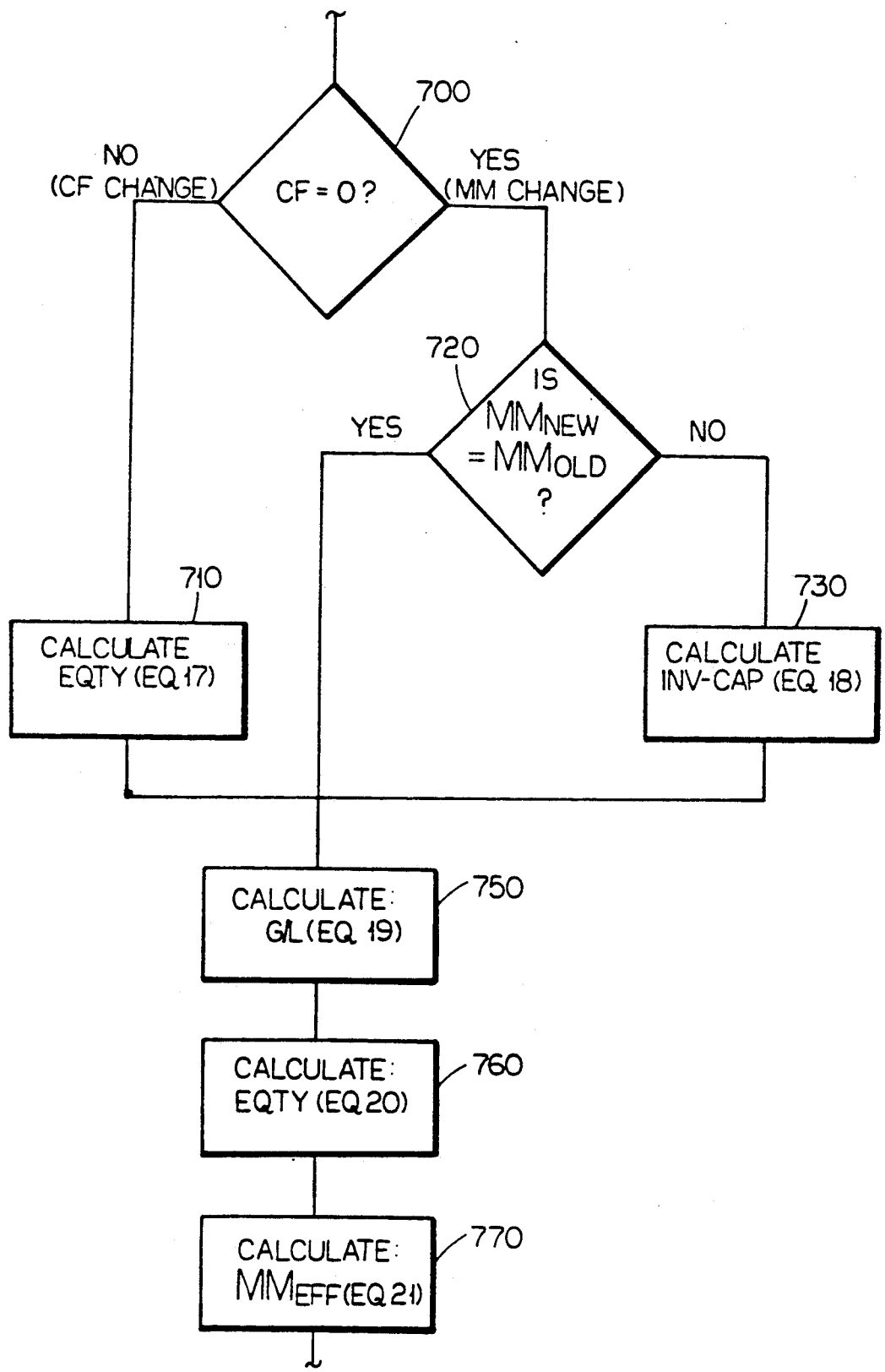
Figure 6E:
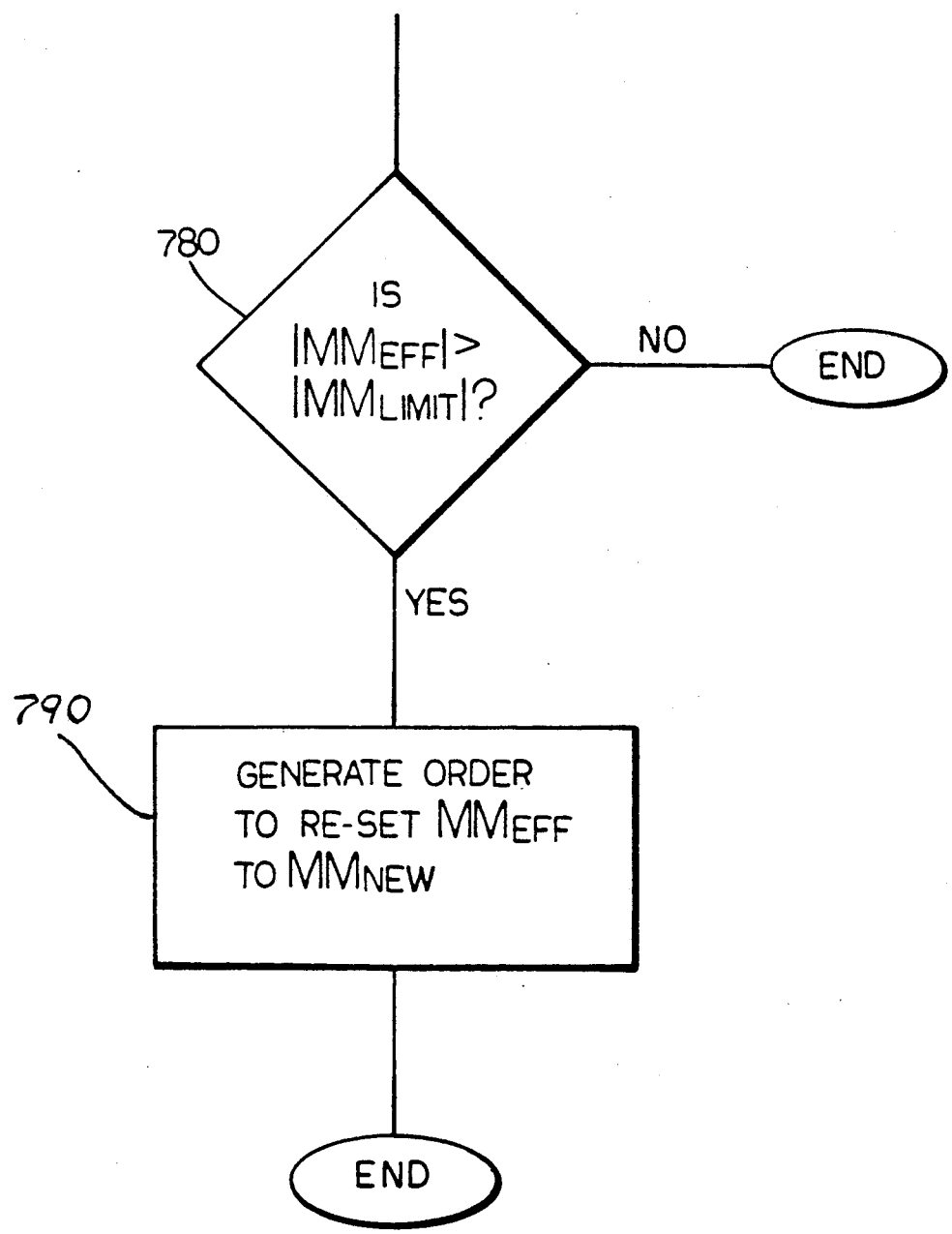

FIGS. 5 and 6 provide flow charts for the Pre-Trade and Post-Trade Account Adjustments. Table 1 below provides a variable list for these flow charts.

TABLE 1

| | |
|---|---|
| 1. ASST | - asset group undergoing adjustment |
| 2. CF | - cash flow; amount added or withdrawn by |

TABLE 1-continued

| | | customer |
|---|---|---|
| 3. | CUST ID | - customer identification or label |
| 4. | EFFSAMT | } amount of dollars and units (+) to buy, or sell (−) to adjust the required hedge for |
| 5. | EFFUNIT | } this customer's new position |
| 6. | EQTY | - net value of customer holdings in this asset group |
| 7. | G/L | - unrealized gain/loss for customer for asset group |
| 8. | IDX | - current asset's market index value |
| 9. | INV-CAP | - the position of a customer's capital that is responding to this asset category's market index |
| 10. | LOT | - position (units) in customer account for a designated (T) trade |
| 11. | LV | - implied "leverage" of customer for long position |
| 12. | MM | - specified market multiple of asset category |
| 13. | $MM_{EFF}$ | - effective market multiple |
| 14. | $MM_{LIMIT}$ | - the limit the system proprietor sets on the $MM_{EFF}$ for this asset category |
| 14. | OVSA | - original value of selected assets; asset chosen by customer from prior Lots (T) for current sale in the market |
| 15. | SD | - implied short deposit: amount allocated by customer for a "short" position in an asset |
| 16. | SP | - implied short proceeds; initial value of asset "sold" for a short position |
| 17. | UNIT | - total implied units of participation owned (long) or sold (short) |

In the formulae that follow, subscripts "OLD" and "NEW" indicate whether or not the value of a variable was determined before or after the latest determination of the asset's market index.

Referring now to FIG. 5, the Pre-Trade Account Adjustment logic path is provided. At Block 200, the inputted data includes the Customer Identification (CUST ID), Asset Group (ASST), the new multiple for that Asset Group ($MM_{NEW}$), and the amount deposited or withdrawn from that Asset Group (CF). Test 210 checks CF for three possible values: negative, positive or zero. If CF is positive, this indicates an allocation to this asset group and logic branches to 220 and 250, wherein the following calculations are performed:

$$EFFSAMT = CF \cdot M_{NEW} \quad (1)$$

$$EFFUNITS = 0 \quad (2)$$

If money is withdrawn, CF<0, and logic branches to Blocks 230 and 260. The system therein determines the following quantities:

$$EFFSAMT = 0 \quad (3)$$

$$EFFSAMT = [-1 \cdot Min[|CF|, INV\text{-}CA + G/L\text{-}] \cdot UNIT]/[INV - CAP + G/L] \quad (4)$$

In EQ (4), the system selects the minimum value between the absolute value of CF and the equity (INV-CAP+G/L) for this asset.

When the account multiple is changed, CF=0, and logic branches to Blocks 240 and 270, the system performs the following adjustments reflective of a changing MM:

$$EFFSAMT = MM_{NEW} \cdot (-LV + SP + SD) \quad (5)$$

$$EFFUNIT = UNIT \cdot (MM_{NEW} - 1) \quad (6)$$

The above Pre-Trade Adjustments are made pursuant to the entry of a customer request, e.g., a deposit/withdrawal or a new multiple. Composite requests are broken down into the single request format and entered into the system separately. These requests are accumulated for each customer and asset group during the pre-trade cycle; in this way, a customer may make several adjustments all within the same cycle. At the trading cut-off, the composite EFFUNITS and EFFSAMT are summed and converted into purchase/sale orders of various capital instruments, e.g., futures contracts, stocks, bonds, gold, etc. The market value or index at which the composite trade was executed is entered as a system parameter, and used in Post-Trade Account Adjustments as described hereinbelow.

More particularly and referring to FIG. 6, the individual accounts are adjusted pursuant to the most recent trade data. FIG. 6 provides a logic flow path for the operative system regarding Post-Trade Account Adjustments. At Block 400, the system receives inputted data on each customer, including CUST ID, asset group, current multiple ($MM_{NEW}$), cash flow (CF) and the market index (IDX) for that asset group for the last trade execution.

Applying the recent index (IDX) from the last trade, the system determines Δ UNIT and UNIT at Blocks 410 and 420, respectively:

$$\Delta UNIT = (EFFSAMT/IDX) + EFFUNIT \quad (7)$$

$$UNIT = UNIT + \Delta UNIT \quad (8)$$

When the customer has withdrawn funds, he/she can select the specific asset units that are traded during execution for currency. Since prior positions are identified by lot number, the customer can choose to reduce assets (units) "purchased" much earlier having a certain basis, or select later acquired units from a more recent allocation for that customer having a potentially different basis. The choice will depend upon the tax implications sought by the customer. In this way, the customer can select assets for transactions to minimize the capital gain or maximize capital loss.

More particularly, Test 430 determines whether assets are sold (i.e., CF<0 indicating asset withdrawal); if so, logic branches to Block 440 wherein the above-described calculation to determine the net gain or loss, Δ G/L, is made pursuant to the customer selected lots and the following relationship:

$$G/L = |UNIT \cdot IDX| - |OVSA(T)| \quad (9)$$

wherein OVSA represents the Original Value of Selected Assets. If CF>0, then by definition, Δ G/L=0 (Block 450).

Continuing in FIG. 6, Test 500 determines whether the new multiple, $MM_{NEW}$, is negative (reflecting an implied short position); if so, logic branches to Block 510 and the implied leverage, (i.e., the amount of implied borrowing by the customer to support a long position) is set to zero (LV=0).

If $MM_{NEW}$ is not negative, the customer is "long" and logic branches to Test 520, which adjusts the logic path contingent on the value of cash flow, (CF). If CF>0, then the leverage is recalculated at Block 530.

$$LV = LV + (CF \cdot (MM_{NEW} - 1)) \quad (10)$$

If CF<0, then leverage is calculated at Block 540:

$$LV = LV - Min[|(MM_{NEW} - 1) \cdot CF|, LV] \quad (11)$$

wherein the system selects the minimum value between the current leverage and the portion of the withdrawal allocated to borrowed funds. This step insures that withdrawals from the account reduce implied leverage proportionately.

If CF=0, logic branches to Test 550 wherein the last multiple ($MM_{OLD}$) is checked; if $MM_{OLD}<0$, the customer has shifted from short to long and the new leverage position is calculated in Block 560:

$$LV = [(|UNIT_{OLD}|^*IDX)^*(MM_{NEW}-1)] - SD + SP \quad (12)$$

If $MM_{OLD}>0$, then the customer has remained long in the asset and leverage is recalculated as follows (Block 570):

$$LV = LV + (\Delta UNIT^*IDX) \quad (13)$$

Test 600 checks the current value of the multiple ($MM_{NEW}$); if greater than zero, the customer is long and, by definition, the short proceeds (SP) and short deposit (SD) are set at zero in Block 610. If $MM_{NEW}<0$, the customer is short and the system calculates the SP and SD for the customer. More particularly, at Block 620, the short proceeds are calculated based on all customer lots from prior transactions:

$$SP = \Sigma(UNIT_{rem}^*IDX) \quad (14)$$

Wherein $UNIT_{rem}$ is the amount of remaining units in each lot and the sum is for all lots for that customer-asset.

If $MM_{OLD}>0$, Test 630, the customer has gone from long to short in the asset, and the short deposit is determined in Block 640, as follows:

$$SD = (UNIT_{OLD}^*IDX) - LV_{OLD} \quad (15)$$

Wherein the UNIT and leverage value are from the prior long position. If the $MM_{OLD}<0$, the customer has remained short, and the short deposit is adjusted in Block 650 as follows:

$$SD = SD + CF \quad (16)$$

Continuing in FIG. 6, if a deposit or withdrawal has been made ("NO" to Test 700), logic branches to Block 710, and the current customer investment capital corresponding to the asset category is determined:

$$INV\text{-}CAP = INV\text{-}CAP + CF + \Delta G/L \quad (17)$$

If CF=0 and $MM_{NEW}=MM_{OLD}$, INV-CAP is unchanged; if the sign of $MM_{NEW} \neq$ sign of $MM_{OLD}$, then INV-CAP is calculated as follows:

$$INV\text{-}CAP = (UNIT_{OLD}|^*IDX) - LV + SD + SP \quad (18)$$

The system then determines the gain or loss (G/L) for this asset pursuant to Block 750:

$$G/L = (UNIT_{TOT}^*IDX) - LV + SD + SP - INV\text{-}CAP \quad (19)$$

Followed by the determination of Equity (Block 760):

$$EQTY = INV\text{-}CAP + G/L \quad (20)$$

Finally, the effective multiple ($MM_{EFF}$) is calculated, based on current index and equity in that asset (Block 770):

$$MM_{EFF} = (UNIT_{TOT}^*IDX)/(INV\text{-}CAP + G/L) \quad (21)$$

The system then determines if the effective multiple ($MM_{EFF}$) is greater than the limit the system proprietor has set for effective multiples ($MM_{LIMIT}$). If so, then (Block 790) the systems generates the order to "re-set" the effective multiple to the specified. This order is handled just like the customer had called in the same order and is executed by entering the order in Block 100.

The above calculations are repeated for each transacted asset in the customer's account and for each customer requesting transactions that were effected during the most recent trade execution. The updated accounts are stored in memory and accessed according to need, e.g., monthly statements and account status requests.

In this way, the system provides the performance of a low-cost investment in key asset groups via accounts under automatic management. The individual investors select the desired assets and level of risk exposure and the system creates an investment position in response thereto.

EXAMPLE

The system operation is more easily understood in the context of an example of its use. The following example is directed to the various system adjustments and transactions as applied to a single investor, bearing in mind that many investors would be accessing the system simultaneously.

More particularly, and referring to FIG. 7, a spread sheet is shown with the first column representing a sequence of events inputted into the system governing a single account. These events have row numbers 1-31 with the additional labels of "pre" and "post" indicating the form of adjustment made to the customer's account, i.e., the Pre-Trade and Post-Trade Account Adjustments. The system maintains and adjusts multiple accounts in a manner similar to that exemplified in FIG. 7.

On line 1, the customer has requested a "purchase" of $20,000 (CF=$20,000) of participation in the U.S. Stock Market at a "long" multiple (MM)=1.5. The Pre-Trade Account Adjustments calculate both EFF$AMT (at $30,000) and EFFUNIT (at 0) in preparation of a trade pursuant to the customer's deposit.

At columns 14-16, the trade order to the system (in this example, a single customer) is shown at the index value (IDX) of 300, the current market price of the S & P 500 index. From this transaction, the system updates the customer's account through the post-trade algorithms, as summarized on line 2. In this regard, leverage, LV, is calculated from EQ 10 above to be $10,000, and so on.

On line 4, a market value increase of +30 is translated to a $3,000 Gain in Column 10 (30 * 100 units). Otherwise, the customer entered no changes to the account during this trading period.

On line 6, the customer has increased his long position by changing his multiple (MM) to 2. Based on this change, EFF$AMT and EFFUNIT values are determined and converted into an adjusted equity position through the implied purchase of 39.39 units at an index value of 330 (IDX); continuing on line 7, the customer's account is updated pursuant to this transaction.

Continuing in a similar manner, FIG. 7 exemplifies various changes in system parameters and the impact these changes have on the customer's position. Please note that line 30 involves a "reset" wherein the customer desires that the effective multiple ($MM_{EFF}$) match the selected multiple ($MM_{NEW}$); this reset process results in a closer relationship between actual market performance and the response of the customer's portfolio, in accordance with the original multiples. Resetting the multiple this way can be done automatically when the effective multiple in the system, $MM_{EFF}$, exceeds the limit set by the system proprietor), or as a basis of a separate request as shown above.

The principles of the above system, described in reference to the U.S. equity market, as measured by the S & P 500, are equally applicable to trading in other asset categories, thereby providing a participating investor the opportunity to select and balance the portfolio risk exposure in countervailing investment opportunities. For example, the investor may allocate his investment assets with an aggressive, MM = 1.5, in a U.S. dollar index position, balanced by going short, MM = −1.0, in gold. By pooling this investor's position with many like and oppositely positioned investors at a minimal fee, the system lowers overall transaction costs to each investor. This fee may be contingent on net asset value for a set period, or determined on some other basis, e.g., extent of participation in the various assets or the number of transactions for a given period.

The above-described arrangement is merely illustrative of the principles of the present invention. Numerous modifications and adaptations thereof will be readily apparent to those skilled in the art without departing from the spirit and scope of the present invention.

What is claimed is:

1. A data processing system for administering a program to provide a future return commensurate with a selected degree of correspondence to a capital market, said system comprising:
   means for receiving and storing data on accounts from participating investors, including for each account a selected proportionality factor, MM, indicative of the degree of correspondence between a valuation of said account and valuation of said capital market;
   means for receiving adjustment requests from said participating investors for said accounts;
   means responsive to said adjustment requests for determining an asset transaction in said capital market wherein said asset transaction is proportional to a net aggregate value of all said adjustment requests for said asset; and
   means for adjusting said participating investor accounts responsive to said asset transaction and said adjustment requests.

2. The system of claim 1, wherein said capital market valuation is characterized by an index value of selected assets on said capital market.

3. The system of claim 2, wherein said means responsive to said adjustment requests includes means for determining a net purchase or sale of assets selected from the group consisting of futures contracts, options, common stocks, bonds, currencies and commodities.

4. The system of claim 3, wherein said data processing system is a stored program controlled digital computer that iteratively adjusts each investor account, pursuant to said asset transactions.

5. The system of claim 4, wherein said means for receiving adjustment requests includes means for accepting deposits or withdrawals for each investor account.

6. The system of claim 5, wherein said investor account data includes current and past valuations of said account.

7. A data processing method for administering a program to provide an investment account a rate of return commensurate with an established capital market, said method comprising the steps of:
   a. Receiving and storing account parameters for said investment account, including an account asset allocation and a selected proportionality factor relating the rate of return between said investment account to said established capital market;
   b. Receiving on a periodic basis a market index value (IDX), wherein said market index value represents a valuation of assets for said established capital market;
   c. Receiving adjustments to said account parameters and determining a position change for said investment accounts based thereon;
   d. Determining a total net position change for all participating investors at said market index value (IDX).
   e. Adjusting said account parameters responsive to said position change for said investment account.

8. The method of claim 7, wherein said total net position change for all investor accounts is translated into purchase or sale-orders of assets selected from the group consisting of futures contracts, options, common stocks, bonds, currencies and commodities.

9. The method of claim 8, wherein said receiving and storing step (a) includes maintaining said MM through position changes in said account.

10. The method of claim 9, wherein said receiving and storing step (a) further comprises deposits or withdrawals (CF).

11. In combination in a data processing system for supervising an investment group of plural investment accounts, each account having investment parameters including an account balance and a proportionality factor, said data processing system comprising: market data entry means for receiving a current market index representative of a periodic valuation of a selected market; account data entry means for receiving account deposits, withdrawals and changes to said proportionality factor; means for determining an investment group investment position in the selected market in response to an aggregate adjustment to said accounts; data processing means responsive on a periodic basis to said current market index deposits, withdrawals or changes in said proportionality factor for adjusting each account so that an account valuation corresponds to the selected market index; storage means for recording net changes in account balances and said investment group investment position; and output means for interactive communication to said market and system participants.

12. In combination in the system of claim 11, wherein said proportionality factor is a factor applied to each said investment account indicative of the arithmetic relationship between an account valuation and a valuation of the selected market.

13. In combination in the system of claim 11, wherein said market index corresponds to an asset price as transacted on said selected market.

14. In combination in the system of claim 13, wherein said asset price corresponds to futures contracts on said selected market.

15. In combination in a data processing system for managing plural accounts to provide for each account a rate of return commensurate to an established form of capital, comprising: a data entry means for receiving and storing information on each said account including an account balance and a proportionality factor relating the rate of return between the account balance and the established form of capital, a customer request entry means for entering changes to the account information including deposits, withdrawals and changes to said proportionality factor for said account, a data processing means for determining an investment position contingent on an aggregation of said account information, a market communication means to effect a transaction pursuant to said investment position. and an automatic adjustment means to adjust said accounts corresponding to said transaction and said proportionality factor pursuant to preset limits regarding an exposure level for said account in said form of capital.

16. The system of claim 15 wherein said proportionality factor is a market multiple, MM(I), providing a long or short market relationship between the valuation of said form of capital on a market and the valuation of said account. contracts, options, common stocks, bonds, currencies and commodities.

17. The system of claim 16 wherein said automatic adjustment means compares an effective MM(I) for said account to a preset limit and effects a transaction that adjusts said account so that said effective MM(I) for the account is below said present limit for said account.

18. The system of claim 15 wherein said transaction is effected in assets selected from the group consisting of futures contracts, options, common stocks, bonds currencies and commodities.

* * * * *